(12) United States Patent
Chang et al.

(10) Patent No.: US 11,215,291 B2
(45) Date of Patent: Jan. 4, 2022

(54) VALVE ASSEMBLY (71) Applicant: ARTEMIS INTELLIGENT POWER LIMITED, Loanhead (GB)

(72) Inventors: Mun Keong Chang, Loanhead (GB); Henry Dodson, Loanhead (GB); Jens Eilers, Loanhead (GB)

(73) Assignee: ARTEMIS INIELLIGENT POWER LIMITED, Loanhead (GB)

( * ) Notice: Subject to any disclaimer, the term of this patent is extended or adjusted under 35 U.S.C. 154(b) by 0 days.

(21) Appl. No.: 16/645,381

(22) PCT Filed: Aug. 31, 2018

(86) PCT No.: PCT/GB2018/052466
§ 371 (c)(1),
(2) Date: Mar. 6, 2020

(87) PCT Pub. No.: WO2019/048830
PCT Pub. Date: Mar. 14, 2019

(65) Prior Publication Data
US 2020/0292096 A1    Sep. 17, 2020

(30) Foreign Application Priority Data

Sep. 7, 2017   (GB) ..................... 1714415

(51) Int. Cl.
*F16K 31/06*     (2006.01)
*F04B 7/00*      (2006.01)
(Continued)

(52) U.S. Cl.
CPC ........ *F16K 31/0655* (2013.01); *F04B 7/0076* (2013.01); *F04B 1/053* (2013.01);
(Continued)

(58) Field of Classification Search
CPC ............ F16K 31/0651; F16K 31/0655; F16K 31/0675; F16K 31/0624; F16K 31/0631;
(Continued)

(56) References Cited

U.S. PATENT DOCUMENTS 6,345,608 B1   2/2002  Rembold et al.
7,331,564 B2   2/2008  Moreno et al.
(Continued)

FOREIGN PATENT DOCUMENTS

CN   104373267 A   2/2015
CN   104685200 A   6/2015
(Continued)

OTHER PUBLICATIONS

International Search Report issued in corresponding International Application No. PCT/GB2018/052466, dated Dec. 6, 2018, pp. 1-4, European Patent Office, Rijswijk, Netherlands.
(Continued)

*Primary Examiner* — Matthew W Jellett
(74) *Attorney, Agent, or Firm* — Hauptman Ham, LLP (57) ABSTRACT

A valve assembly for regulating the flow of working fluid between a working chamber of a fluid working machine and a working fluid gallery comprises: a valve comprising a valve member and one or more cooperating valve seats; an actuator actuatable to apply a force to urge the valve member away from or towards the one or more valve seats; and a coupling between the actuator and the valve member. The coupling comprises a connector located at least partially within a tube. A connector void provided between at least a portion of the connector and the tube is in fluid communication with a working fluid gallery outlet.

18 Claims, 3 Drawing Sheets

(51) Int. Cl.
  *F04B 1/053*  (2020.01)
  *F04B 53/10*  (2006.01)

(52) U.S. Cl.
  CPC ........... *F04B 53/10* (2013.01); *F16K 31/0651* (2013.01); *F16K 31/0675* (2013.01)

(58) Field of Classification Search
  CPC .... F16K 31/0606; F04B 7/0076; F04B 1/053; F04B 1/0465; F04B 53/10; F04B 53/102; F03C 1/0444
  See application file for complete search history.

(56) References Cited

U.S. PATENT DOCUMENTS

| | | | |
|---|---|---|---|
| 9,494,117 B2 | 11/2016 | Gargiulo et al. | |
| 9,970,399 B2 | 5/2018 | Marechal et al. | |
| 2005/0139273 A1* | 6/2005 | Morselli | F16K 31/06 137/625.64 |
| 2006/0237672 A1 | 10/2006 | Moreno et al. | |
| 2017/0254306 A1* | 9/2017 | Lucas | F16K 27/029 |
| 2020/0056572 A1* | 2/2020 | Landenberger | F16K 27/029 |
| 2020/0248829 A1* | 8/2020 | Fukuda et al. | H01F 7/16 |

FOREIGN PATENT DOCUMENTS

| | | |
|---|---|---|
| DE | 102011108207 A1 | 6/2012 |
| EP | 3171061 A1 | 5/2017 |
| WO | 2010073040 A1 | 7/2010 |
| WO | 2010073041 A1 | 7/2010 |
| WO | 2011148653 A2 | 12/2011 |
| WO | 2014132089 A1 | 9/2014 |

OTHER PUBLICATIONS

Written Opinion of the International Search Authority issued in corresponding International Application No. PCT/GB2018/052466, dated Dec. 6, 2018, pp. 1-6, European Patent Office, Rijswijk, Netherlands.

Chinese Office Action issued in corresponding Chinese Application No. 201880057623.9, dated Aug. 27, 2021, pp. 1-3.

\* cited by examiner

VALVE ASSEMBLY

The present application is a National Phase of International Application Number PCT/GB2018/052466, filed Aug. 31, 2018, which claims priority to Great Britain Application No. 1714415.5, filed Sep. 7, 2017, and both are hereby incorporated by reference in their entirety into the present application.

FIELD OF THE INVENTION

The invention relates to valve assemblies for regulating the flow of working fluid between a working chamber of a fluid working machine and a working fluid gallery, and fluid working machines comprising a working chamber, a working fluid gallery and such valve assemblies.

BACKGROUND TO THE INVENTION

Valve assemblies for regulating the flow of working fluid between a working chamber of a fluid working machine and a working fluid gallery are known. In some such valve assemblies, the movement of a valve member towards or away from a valve seat is actuated by an actuator coupled to the valve member by a coupling. Fluid leakage in working fluid working machines is common and consequently couplings are commonly surrounded by working fluid in use. During each cycle of working chamber volume, the pressure in the working chamber cycles and therefore the pressure of leaked fluid surrounding the couplings also cycles. The pressure of leaked fluid surrounding the couplings also tends to increase gradually during operation of the valve. Increased fluid pressure and, particularly, cycling of fluid pressure around the coupling typically require components to be manufactured from high-strength and highly fatigue-resistant materials otherwise fatigue failure is common and component lifetimes are short.

The invention concerns improvements to the structure of such valve assemblies which have advantages including reduced pressure cycling around coupling components and reduced fluid pressures around said coupling components, thereby extending component lifetimes before failure.

SUMMARY OF THE INVENTION

A first aspect of the invention provides a valve assembly for regulating the flow of working fluid between a working chamber of a fluid working machine and a working fluid gallery. The valve assembly typically comprises: a valve comprising a valve member and one or more cooperating valve seats; an actuator actuatable to apply a force to urge the valve member away from or towards the one or more valve seats; and a coupling between the actuator and the valve member. The coupling typically comprises a connector located at least partially within a tube. A connector void provided between at least a portion of the connector (typically the exterior wall thereof) and the tube (typically an interior wall thereof) is typically in fluid communication with a working fluid gallery outlet.

The working fluid gallery outlet typically fluidly connects to the working fluid gallery in use, i.e., when the valve assembly is installed in the fluid working machine for regulating the flow of working fluid between the working chamber and the working fluid gallery. That is to say, the connector void is typically in fluid communication with the working fluid gallery by way of (e.g. through) the working fluid gallery outlet in use, i.e., when the valve assembly is installed in the fluid working machine for regulating the flow of working fluid between the working chamber and the working fluid gallery. Accordingly, working fluid can typically flow between the connector void and the working fluid gallery. This reduces working fluid pressure cycling in the connector void during operation of the fluid working machine. In particular, if pressure in the connector void begins to increase during operation of the fluid working machine (typically due to leakage of working fluid from the working chamber into the connector void or movement of the connector within the tube), working fluid is typically displaced from the connector void, through the working fluid gallery outlet, and into the working fluid gallery. Similarly, if pressure in the connector void begins to decrease during operation of the fluid working machine (typically due to movement of the connector within the tube), working fluid is drawn into the connector void from the working fluid gallery through the working fluid gallery outlet. By reducing working fluid pressure cycling in the connector void, fatigue failure of the valve assembly components becomes less likely and the component lifetimes are increased.

The connector void is typically in fluid communication with the working fluid gallery outlet throughout a (i.e., complete) valve actuation cycle. The connector void may always be in fluid communication with the working fluid gallery outlet throughout the (i.e., complete) valve actuation cycle. Cycling of working fluid pressure in the connector void is therefore typically reduced throughout the (i.e., complete) valve actuation cycle.

The tube typically has a maximum wall thickness which is not more than twice an internal diameter of the tube. The tube typically has a minimum axial length which is more than two times an external diameter of the tube.

The walls of the tube are configured to avoid excess deformation of the tube, especially in a radial direction, and particularly in embodiments in which the tube is surrounded by a high pressure fluid gallery. This is because, when the tube is surrounded by high pressure fluid, high inwardly-acting pressure forces act on the tube and can otherwise lead to inward deflection of tube walls such that the tube walls may impinge on and rub against the internal connector in use. Resistance to motion of the connector in the axial direction is undesirable. The radial size, or the cross sectional area, or a radial clearance of the connector void may be determined based on the required flow rate of fluid through the said connector void and the anticipated inward deformation of the tube arising from fluid forces in a surrounding fluid gallery may also be determined.

The tube may be a sleeve which extends around a portion of the connector. The sleeve may protrude beyond a face of a fluid gallery bulkhead. The sleeve and connector may be fitted to one another (e.g. an internal diameter of the sleeve and an external diameter of the connector may be selected) such that the sleeve fits around the connector while still providing a connector void between the connector and said sleeve, and such that the required flow rate and lack of frictional resistance is maintained during a pressure-on event). The sleeve may have one or more external faces which are exposed to fluid in a surrounding fluid gallery when in use. Fluid gallery pressure acting on the external faces of the sleeve typically acts so as to cause the sleeve to deflect inwards towards the connector during pressure-on. Deflection of the sleeve towards the connector acts as a seal to reduce leakage of working fluid from the working chamber (through the first connector guide clearance along the connector) to the connector void region. The connector void may be a void provided between a portion of the connector and the sleeve.

The connector is typically a mechanical connector. The connector typically extends through the tube. The connector may extend completely through the tube (i.e., along an entire axial length of the tube). The connector is typically movable within the tube.

The connector typically comprises a connecting rod. It may be that the connector is solid (i.e., it may be that the connector is not hollow and/or does not comprise a bore, for example an axial bore). It may be that the connecting rod is solid (i.e., it may be that the connecting rod is not hollow and/or does not comprise a bore, for example an axial bore).

Typically, the connector, or at least the part of the connected located within the tube, extends in an axial direction of the valve assembly. Part or all of the tube may also extend in an axial direction of the valve assembly. The connector may be movable in an axial direction within the tube.

Additional radial clearance between the connector and the tube may be provided by selective reduction in the diameter of the connector, for example by milling or otherwise machining the connector to reduce its diameter over a portion, typically between the bottom guide portion and upper guide portion, such as to provide a greater area to the annular cross section of the connector void, so as to allow for greater flow rates and reduced viscous friction between the connector and the tube.

The working fluid gallery outlet may comprise one or more generally radially extending fluid passages. It will be understood that the one or more generally radially extending fluid passages typically extend generally radially in relation to the axial direction of the valve assembly. The connector void is typically in fluid communication with the working fluid gallery by way of (e.g. through) the one or more generally radially extending fluid passages in use. In such embodiments, the working fluid gallery outlet is typically an interface or port where the working fluid gallery connects to the one or more generally radially extending fluid passages.

It may be that the connector void is in fluid communication with the valve (and/or the working chamber when in use) only by way of one or more leakage paths defined by clearances between valve assembly components which clearances are smaller than or equal to close running or sliding fits.

The coupling typically further comprises an armature located within an armature void which is in fluid communication with the connector void such that the armature void is in fluid communication with the working fluid gallery outlet by way of the connector void.

The armature and the valve member are typically coupled to each other such that the position of the armature influences and is influenced by the position of the valve member. The armature and the valve member may be coupled to each other by the connector. It may be that the connector is fixedly attached to or integrally formed with the valve member and the armature, thereby linking (i.e., axial) motion of the armature directly to that of the valve member. However, in some embodiments it may be that the armature and connector are not fixedly attached to one another. For example, it may be that the armature is connected to the connector by one or more springs. It may be that the armature bears on the connector only at one part of its (i.e., axial) travel.

A fluid flow path between the armature void and the working fluid gallery outlet, by way of the connector void, is typically an uninterrupted and unchecked fluid flow path (particularly in use during operation of the fluid working machine), that is to say that there is typically no check valve intermediate the armature void and the working fluid gallery outlet. The armature void and the working fluid gallery outlet are typically in continuous fluid communication by way of the connector void.

The connector void may be in fluid communication with the valve by way of a leakage path through a clearance provided between a first connector guide and the connector. The clearance may be located adjacent to the valve, and may be exposed to fluid pressure around the valve.

It may be that fluid communication between the valve (and/or the working chamber when the valve assembly is in use in a fluid working machine, and particularly when the valve member is open allowing working fluid to pass the valve seat through the valve) and the working fluid gallery outlet, and/or that fluid communication between the valve and the armature void, is by way of the leakage path between the first connector guide and the connector.

Where the connector is a connecting rod, the first connector guide may be a first rod guide, located adjacent to the valve, and the clearance may be provided between the first rod guide and the connecting rod.

The valve assembly may comprise a second connector guide which provides radial guidance for the connector. The second connector guide may form part of the tube. The second connector guide may be fixedly attached to the tube. Where the connector is a connecting rod, the second connector guide may be a second rod guide which provides radial guidance for the connecting rod.

A clearance between the connector and an internal wall of the tube and/or second connector guide is typically sufficiently large such that, (i.e., in use) throughout a (i.e., complete) valve actuation cycle, deflection of the tube and/or of the second connector guide, due to a pressure differential thereacross, does not cause the said tube and/or second connector guide to impinge on the connector.

The tube may extend from, into, and/or through a fluid and at least part of the outer wall of the tube forms part of a (typically inner) wall of the fluid gallery wall. The wall of the fluid gallery may be a fluid gallery bulkhead. The tube may be fixedly attached to or integrally formed with a base component and configured to form a (hermetic) seal for the fluid gallery, e.g. between the fluid gallery and the connector void. The base component may seal the fluid gallery from the working chamber. The base component may also form part of the walls of the fluid gallery. A or the wall of the fluid gallery may be provided between the working chamber and a fluid gallery.

It may be that the base component defines a valve member void in which the valve member is operably located.

The fluid gallery is typically different from the working fluid gallery. The working fluid gallery could be seen as a first fluid gallery and the fluid gallery could be seen as a second fluid gallery.

The fluid gallery may surround at least a portion of the tube.

It may be that the valve is a low pressure valve, the working fluid gallery is a low pressure fluid gallery, and the fluid gallery is a high pressure fluid gallery.

A portion of the connector void and/or one or more of the one or more generally radially extending fluid passages may extend into and/or completely through the base component.

It may be that the first connector guide is fixedly attached to or integrally formed with the base component.

It may be that the connector void extends beyond the tube into the fluid gallery wall (e.g. the fluid gallery bulkhead) and fluidly connects to at least one of the one or more generally radially extending fluid passages. It may be that the connector void extends beyond the tube into the base component and fluidly connects to at least one of the one or more generally radially extending fluid passages.

It may be that the connector void extends axially between the armature void and the first connector guide.

It may be that an external region (e.g. external wall) of the first connector guide and an external region (e.g. external wall) of the second connector guide are located in regions of the valve assembly which are not pressurized (i.e., when in use) so that they are not subject to pressure exerted by the working fluid gallery and/or the fluid gallery and/or the working chamber.

It may be that the first connector guide comprises a tube portion which extends away from a side of the fluid gallery wall which faces towards the working chamber, in use, such that an external wall of the tube portion is exposed to working chamber pressure. It may be that the tube portion is internally dimensioned to fit around the connector so that working chamber pressure during pressure-on (i.e., when in use) acts on the external wall of the tube portion to cause said external wall to deflect towards the connector so as to restrict leakage of fluid from the working chamber, through the clearance along the connector, into the connector void.

It may be that at least a portion of the connector extends at least part-way through the fluid gallery wall. It may be that the fit between the connector and at least a portion of the fluid gallery wall provides a close running or sliding fit.

It may be that a fluid connection (e.g. a path for fluid flow comprising dedicated fluid flow void and/or leakage paths) is formed between the working chamber and the connector void by way of the valve member void and the first connector guide. It may be that a fluid connection (e.g. a path for fluid flow comprising dedicated fluid flow void and/or leakage paths) is formed between the working chamber and the armature void by way of the valve member void, the first connector guide, the connector void and the second connector guide. It may be that a fluid connection (e.g. a path for fluid flow comprising dedicated fluid flow void and/or leakage paths) is formed between the working chamber and the working fluid gallery by way of the valve member void, the first connector guide, the connector void and the one or more generally radially extending passages.

The tube may comprise at least one tube void. The at least one tube void may be located within one or more walls of the tube, (e.g. between an interior wall and an exterior wall of the tube). The at least one tube void typically provides a fluid flow path between the working fluid gallery outlet and the armature void and/or the connector void. The tube void may terminate at the armature void, directly adjacent the connector void. Thus fluid may readily be communicated between the connector void and the tube void. The tube void may be in the form of one or more drillings or through-holes, entirely through the length of the tube.

The connector may comprise a further void in the form of at least one connection void, said connection void located within the walls of the connector, and provides a fluid path between the working fluid gallery outlet, and the armature void and/or the connector void. The connection void may terminate at the armature void, directly adjacent the connector void. Thus fluid may readily be communicated between the connector void and the connection void. The tube void may be in the form of one or more axial drillings or through-holes, partially through the length of the tube, and these axial drillings or through-holes are then connected, via a break through hole/drilling/recess in the connector to generally radial drillings which join the innermost end of the radial drillways in the bulkhead with the axial drilling. The axial drillings or through holes through the connector, and the hole/drilling/recess in the connector, together form the connection void.

It may be that the armature comprises one or more armature fluid passages. The one or more armature fluid passages may extend (e.g. axially) through the armature. The one or more armature fluid passages are typically in fluid communication with the connector void and the armature void. This typically permits fluid to flow between the armature void and the connector void by way of the one or more armature fluid passages. Pressure build-up due to, for example, compression of fluid in the armature void on movement of the armature within the armature void is thereby typically reduced.

The armature may be magnetic. The armature may be formed from magnetic material (e.g. iron). The actuator may be an electromagnetic actuator. The actuator may comprise a solenoid. The solenoid is typically operable to exert a force on, and thereby move, the magnetic armature.

Pressure in the connector void does not typically rise above fluid working machine inlet pressure in use. Pressure in the armature void does not typically rise above fluid working machine inlet pressure in use.

The working fluid is typically hydraulic fluid.

A second aspect of the invention provides a fluid working machine comprising a working chamber (having a volume which varies cyclically in use), a working fluid gallery and a valve assembly according to the first aspect of the invention, the valve assembly being arranged to regulate the flow of working fluid between the working chamber and the working fluid gallery.

It may be that the fluid working machine comprises a plurality of working chambers each associated with a respective valve which is selectively connected to the (i.e., the same) working fluid gallery by said respective valve. Thus the working fluid gallery is typically a common working fluid gallery, common to and fluidly connected with a plurality of valve assemblies. In embodiments in which the working fluid gallery is a low pressure fluid gallery, some or all of the plurality of valve assemblies (wherein each said valve assembly is associated with a respective working chamber) could be connected to the said low pressure gallery and/or some or all of the plurality of valve assemblies could be connected to a crankcase cavity (which typically surrounds all working chambers) and/or some or all of the plurality of valve assemblies could be connected to a boosted pressure gallery (the boosted pressure gallery containing working fluid pressurized above atmospheric pressure, typically by a boost pump). In embodiments in which the working fluid gallery is a high pressure gallery, some or all of the plurality of valve assemblies (each associated with a respective working chamber) could be connected to the said high pressure gallery.

It may be that the tube extends (e.g. completely) through a fluid gallery, thereby forming a part of the wall of the fluid gallery and/or is fixedly attached to or integrally formed with a base component configured to form a (hermetic) seal for the fluid gallery e.g. between the fluid gallery and the connector void.

It may be that the valve does not regulate a flow of working fluid between the working chamber and the fluid gallery, that is to say that the fluid gallery is different from the working fluid gallery.

It may be that the valve is a low pressure valve, the working fluid gallery is a low pressure fluid gallery, and the fluid gallery is a high pressure fluid gallery.

Optional and preferred features of any one aspect of the invention may be features of any other aspect of the invention.

DESCRIPTION OF THE DRAWINGS

An example embodiment of the present invention will now be illustrated with reference to the following figures in which.

DETAILED DESCRIPTION OF AN EXAMPLE EMBODIMENT

Figure 1:
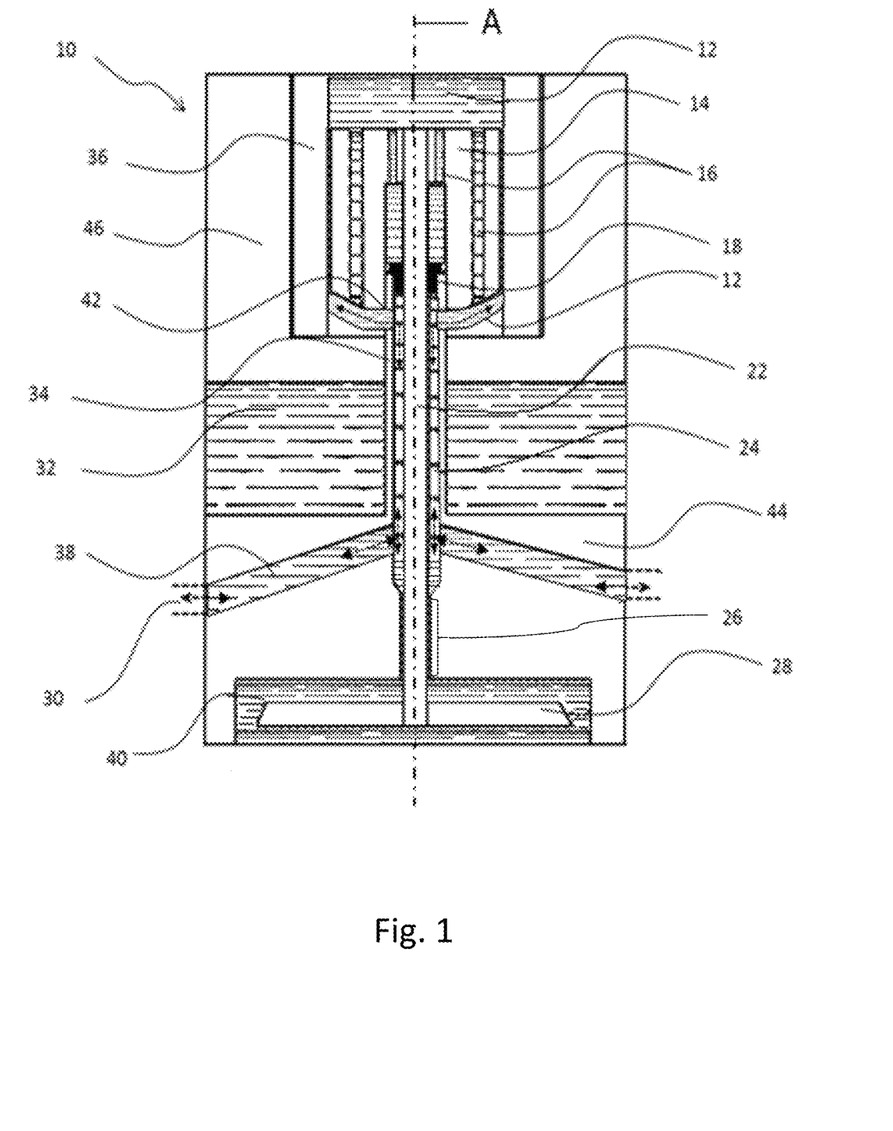
FIG. 1 shows a schematic cross section through a valve assembly.

FIG. 1 is a schematic cross section through an example embodiment of a valve assembly 10. The valve assembly has an annular valve member 28 (the valve member) fixedly mounted to a cylindrical, solid connecting rod 22 (the connector) which extends through and is fixedly attached to an armature 14 (the armature). The valve member, connecting rod and armature are arranged along a valve assembly axis A. The valve member comprises two sealing lines.

The valve assembly also has a valve capsule 46 and a pressure bulkhead 44 (the fluid gallery wall or base component). The valve capsule surrounds a solenoid coil 36 (the actuator) which is provided around the armature 14. The armature does not fill all of the space surrounded by the solenoid coil such that an armature void is provided between the armature, the solenoid coil and interior walls of the valve capsule. The pressure bulkhead forms a valve member void 40, which surrounds the valve member 28 and one or more valve seats for the valve member (not shown).

The connecting rod 22 extends through a cylindrical bore through the pressure bulkhead. A first fluid gallery 32 (the fluid gallery) is located between the valve capsule and the pressure bulkhead. A portion 34 of the pressure bulkhead extends in the axial direction between the body of the pressure bulkhead and the valve capsule, through the first fluid gallery, to form a cylindrical tube 34 (the tube) around the connecting rod. The tube 34 extends into and through a portion of the valve capsule and into the armature. A connecting rod void 24 (the connector void) is provided around the connecting rod between the connecting rod and the tube.

A plurality of radial passages 38 (the generally radially passages) extend from the connecting rod void, through the body of the pressure bulkhead 44, and fluidly connect to a second fluid gallery 30 (the working fluid gallery). A plurality of armature passages 16 extend through the body of the armature in the axial direction. Ports 42 are provided in an external wall of the tube immediately adjacent the armature. A portion of the pressure bulkhead 44 immediately adjacent the valve member void 40 is shaped to form a lower connecting rod guide (the first connector guide) with a sliding fit around the connecting rod. An upper connecting rod guide 18 (the second connector guide) is mounted at the end of the tube, inside the armature, and is also shaped for a sliding fit around the connecting rod.

The connector void is in fluid communication with the valve (and/or the working chamber when in use) only by way of one or more leakage paths defined by clearances between valve assembly components. As shown in FIG. 1, the clearances along region 26 are smaller than or equal to close running or sliding fits.

Figure 3:
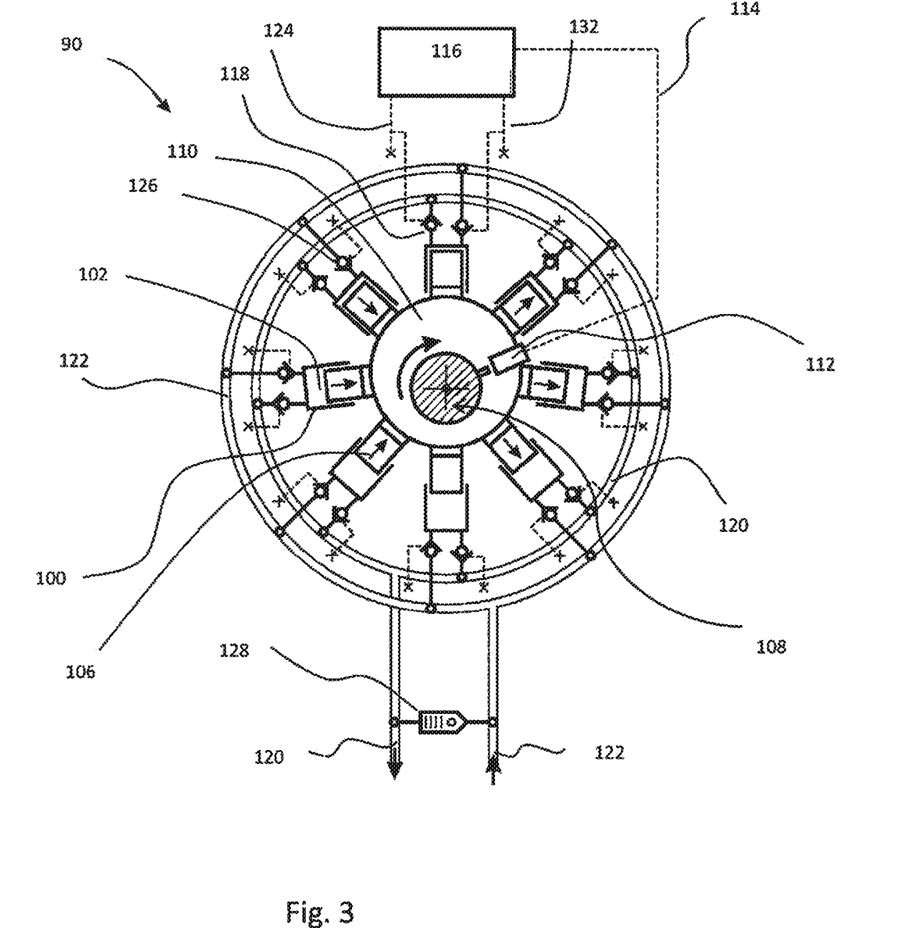
FIG. 3 shows an electronically (or synthetically) commutated hydraulic machine.

The valve assembly is designed for connection to a working chamber (directly fluidly connected, potentially over the full width of the valve 28, to region 40) for use in a hydraulic fluid working machine, and more specifically an electronically (or synthetically) commutated fluid working machine 90 (which may be a pump or a motor) as shown in FIG. 3.

The electronically commutated hydraulic fluid working machine comprises a plurality of cylinders 100 which have working volumes (i.e., working chamber volumes) 102 defined by the interior surfaces of cylinders and pistons 106 which are driven from a rotatable shaft 108 by an eccentric cam 110 and which reciprocate within the cylinders to cyclically vary the working volume of the cylinders. A shaft position and speed sensor 112 determines the instantaneous angular position and speed of rotation of the shaft, and through signal line 114 informs the machine controller 116 of the motor shaft position and/or speed, which enables the machine controller to determine the instantaneous phase of the cycles of each cylinder.

The cylinders are each associated with Low Pressure Valves (LPVs) in the form of electronically actuated face-sealing poppet valves 118, which face inwards toward their associated cylinder and are operable to selectively seal off a channel extending from the cylinder to a low pressure hydraulic fluid line 120, which may connect one or several cylinders, or indeed all as is shown here, to the low pressure hydraulic fluid line 120 of the electronically commutated hydraulic pump/motor. The LPVs are normally open solenoid closed valves which open passively when the pressure within the cylinder is less than or equal to the pressure within the low pressure hydraulic fluid line, i.e., during an intake stroke, to bring the cylinder into fluid communication with the low pressure hydraulic fluid line, but are selectively closable under the active control of the controller via LPV control lines 124 to bring the cylinder out of fluid communication with the low pressure hydraulic fluid line. Alternative electronically controllable valves may be employed, such as normally closed solenoid opened valves.

The cylinders are each further associated with High Pressure Valves (HPVs) 126 in the form of pressure actuated delivery valves. The HPVs open outwards from the cylinders and are operable to seal off a channel extending from the cylinder to a high pressure hydraulic fluid line 122, which may connect one or several cylinders, or indeed all as is shown here, to the transmission high pressure hydraulic fluid line 122. The HPVs function as normally-closed pressure-opening check valves which open passively when the pressure within the cylinder exceeds the pressure within the high pressure hydraulic fluid line. The HPVs also function as normally-closed solenoid opened check valves which the controller may selectively hold open via HPV control lines 132 once that HPV is opened by pressure within the associated cylinder. Typically the HPV is not openable by the controller against pressure in the high pressure hydraulic fluid line. The HPV may additionally be openable under the control of the controller when there is pressure in the high pressure hydraulic fluid line but not in the cylinder, or may be partially openable, for example if the valve is of the type and is operated according to the method disclosed in WO 2008/029073 or WO 2010/029358 (the contents of which are hereby incorporated herein by way of this reference).

In a normal mode of operation while pumping described in, for example, EP 0 361 927, EP 0 494 236, and EP 1 537

333, the contents of which are hereby incorporated herein by way of this reference, the controller selects the net rate of displacement of fluid to the high pressure hydraulic fluid line by an individual working chamber by either holding the LPV of the working chamber open throughout a cycle of cylinder working volume (in which case there is no net displacement of working fluid to the high pressure line, called an idle cycle) or by actively closing one or more of the LPVs typically near the point of maximum volume in the associated cylinder's cycle, thereby closing the path to the low pressure hydraulic fluid line and directing fluid out through the associated HPV on the subsequent contraction stroke (called a pumping cycle). The net displacement of the pump can be varied by mixing idle and pumping cycles on successive cycles of each of the working chambers in a sequence determined the controller synchronous with the shaft rotation and in response to an electronic demand signal.

Due to the digital nature of such control, and the lack of mechanical friction inherent in changing displacement (which a conventional variable stroke machine would have), this machine does not exhibit hysteresis, deadband, and non-linearity in its response to demand. The machine can change displacement (from maximum to zero, or vice versa) within half a shaft revolution due to the relatively rapid rotation speed of the machine shaft (the time for half a shaft revolution would typically be of the order of 10 ms to 20 ms) and therefore the machine responds much faster to control inputs than a variable swashplate pump which would typically exhibit delays of more than 100 ms from an electronic demand signal to pump displacement response.

When motoring, the controller selects the net rate of displacement of fluid from the high pressure hydraulic fluid line by a cylinder by either holding the respective LPV open during a cycle (in which case there is no net displacement of working fluid from the high pressure line to the low pressure line) or by actively closing one or more of the LPVs shortly before the point of minimum volume in the associated cylinder's cycle, closing the path to the low pressure hydraulic fluid line which causes the fluid in the cylinder to be compressed by the remainder of the contraction stroke. The associated HPV opens when the pressure across it equalizes and a small amount of fluid is directed out through the associated HPV. The motor controller then actively holds open the associated HPV, typically until near the maximum volume in the associated cylinder's cycle, admitting fluid from the high pressure hydraulic fluid line and applying a torque to the rotatable shaft. This leads to a motoring cycle. The controller selects the number and sequence of LPV closures and HPV openings to produce a flow or create a shaft torque or power to satisfy a selected net rate of displacement.

As well as determining whether or not to close or hold open the LPVs on a cycle by cycle basis, the controller is operable to vary the precise phasing of the closure of the either or both the HPVs and the LPVs with respect to the varying cylinder volume and thereby to select the net rate of displacement of fluid from the high pressure to the low pressure hydraulic fluid line or vice versa.

Although the machine shown in FIG. 3 is usable as either a pump or a motor, in some embodiments, any such pump which is driven may not have electronically controlled high pressure valves. Instead, the high pressure valve may be a passive check valve, and thus the pump cannot perform a motor function.

Similarly, in some embodiments, corresponding hydraulic motors use entirely passive valves, or commutating port plates, in which case they are less controllable and may be regulated simply by the pressure of received hydraulic fluid.

Returning to the specific valve assembly shown in FIG. 1, the valve member 28 is operable between an open position in which fluid can flow through fluid conduits between the second fluid gallery and the working chamber and a closed position in which the annular valve member seats against the one or more valve seats and restricts the flow of fluid between the second fluid gallery and the working chamber.

The armature 14 is made of a magnetic material such as iron. The solenoid 36 functions as an actuator, selectively applying a force on the armature to drive axial motion of the armature, connecting rod and valve member in order to open and close the valve.

In use, the armature void 12, the armature passages 16, the connecting rod void 24, the radial passages 38, the first fluid gallery 32, the second fluid gallery 30 and the valve member void 40 are filled with hydraulic fluid (indicated by cross hatching in FIG. 1). One of the first and second fluid galleries contains fluid at low (relative) pressure and the other of the first and second fluid galleries contains fluid at high (relative) pressure. For example, it may be that the first fluid gallery which surrounds the tube contains fluid at high pressure and the second fluid gallery contains fluid at low pressure. In this case the valve is a low pressure valve.

During operation of the valve, fluid tends to leak from the working chamber, through the valve member void, through the clearance defined by the lower connecting rod guide and into the connecting rod void and armature void. Leakage of fluid into or out of the connecting rod void and armature void occurs whenever there is a pressure imbalance between the respective voids.

In known valve assemblies which do not have radial passages, fluid pressure in the connecting rod void and armature void typically increases gradually during operation of the valve, as the working chamber typically spends more time than not in a pressurized state. This is because the average pressure in the working chamber is higher when the working chamber carries out pumping or motoring strokes compared to when the working chamber carries out idling strokes, and in typical use, working chambers carry out more pumping or motoring strokes than idling strokes. A pumping cycle includes a piston stroke which is a pumping stroke developing high pressure which is output via the high pressure valve. A motoring cycle includes a piston stroke which is a motoring stroke causing the piston to move by receiving high pressure which enters the working chamber via the low pressure valve. If leakage from the working chamber is significant, the fluid pressure in the connecting rod void and armature void will tend to follow the working chamber pressure and will therefore cycle. Cycling of fluid pressure in the connecting rod void and armature void is also caused, to a lesser extent, by movement of the armature and connecting rod within their respective voids and the resultant displacement of fluid. Cycling of fluid pressure can lead to fatigue failure of the pressure bulkhead and valve capsule components and consequently stronger and more fatigue-resistant materials are typically required. Cycling of fluid pressure also results in an unpredictable pressure force acting on the armature and connecting rod, and so the actuator force required to move the armature and connecting rod is also unpredictable. Increased pressure in the connecting rod void and armature void in general also necessitates use of stronger materials for the valve capsule and pressure bulkhead.

However, when radial passages 38 are provided, fluid can be expelled into or drawn out of the low pressure fluid gallery 30 in response to changes in pressure in the connector rod void and armature void. Cycling of pressure in the respective voids is therefore significantly reduced. In addition, by connecting the respective voids to the low pressure gallery, the fluid pressure in the voids is kept relatively low. Accordingly, the use of stronger and fatigue-resistant materials is not necessary and the lifetime of the various components is significantly extended. The armature passages 16 also enable fluid flow through the armature, reducing pressure cycling caused by displacement of fluid by the armature and permitting relatively unimpeded movement of the armature at high speeds and/or frequencies.

Figure 2:
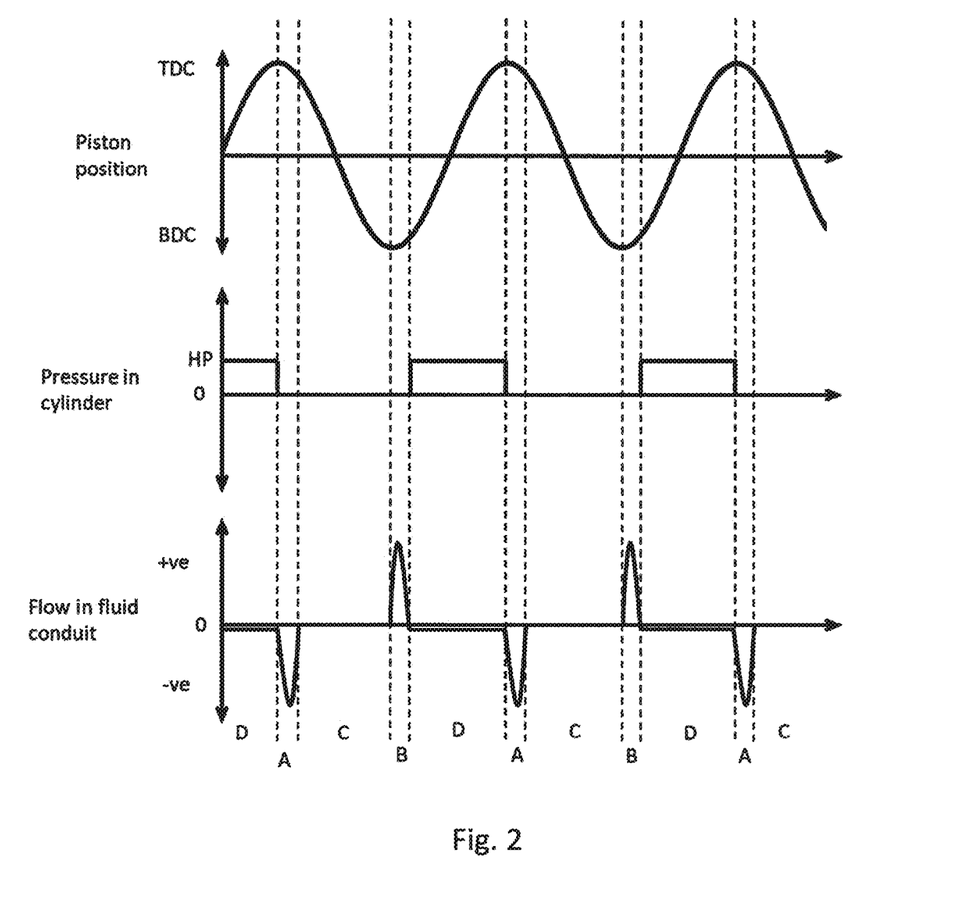
FIG. 2 shows plots of piston position, working chamber pressure and radial passage fluid flow during three valve actuation cycles.

The flow of fluid through the various voids and passages is explained in more detail with reference to FIG. 2, which relates to a pumping series of pumping strokes (pumping cycle). In this case the valve is a low pressure valve. As the piston in the working chamber moves from bottom dead center (BDC) to top dead center (TDC), and back again in a cycle (as shown in the upper graph of FIG. 2), the direction of fluid flow along the radial passages 38 varies and may reverse. In particular, at TDC, when the low pressure valve begins to open, and throughout opening period A (starting from TDC), the connecting rod and armature move axially further into the armature void away from the valve seat and, similar to the action of a poorly sealing piston moving into a cylinder, cause fluid to be displaced out of the armature void and into the connecting rod void and into the radial passages, flowing towards the working fluid gallery (this is shown as a negative fluid flow in the lower graph of FIG. 2). Similarly, at BDC, where the valve begins to close, and throughout closing period B (starting from BDC), the connecting rod and armature move axially towards the valve seat and fluid is drawn through the radial passages into the armature void and connecting rod voids (this is shown as a positive fluid flow in the lower graph of FIG. 2). Movement of the connector in the direction of the valve seat causes a corresponding fluid flow via the connector void region in a direction away from the valve seat. Similarly, movement of the connector in the opposite direction towards the valve seat causes fluid flow towards the valve seat. Between opening of the valve and closing of the valve during period C, the pressure in the working chamber is low and consequently there is no net leakage of fluid from the working chamber via the lower connecting rod guide clearance into the connecting rod void or armature voids and no fluid flow through the radial passages. Between closing of the valve and opening of the valve again during period D, the pressure in the working chamber is high and the pressure difference from the working chamber via the clearance of the lower connecting rod to both the armature void and connecting rod voids will drive leakage of a small volume of fluid from the working chamber, through the lower connecting rod guide clearance, and into the connecting rod void. A small volume of fluid will therefore be expelled through the radial passages (this is shown as a small negative fluid flow in the lower graph of FIG. 2).

In an alternative embodiment in which the valve is a high pressure valve, and therefore the first fluid gallery is a low pressure gallery and the second fluid gallery is a high pressure gallery, the radial passages still provide the benefit of reducing the cycling of pressure in the armature and connecting rod voids, even though the overall pressure in the respective voids is not reduced to low pressure.

The skilled person will understand that the valve assembly described herein could be adapted to form an integrated valve assembly integrating both (i) a low pressure valve comprising a low pressure valve member and one or more low pressure valve seats for regulating flow of working fluid between a working chamber and a low pressure fluid gallery and (ii) a high pressure valve comprising a high pressure valve member and one or more high pressure valve seats for regulating flow of working fluid between a working chamber and a high pressure fluid gallery. In such an embodiment, the high pressure gallery would typically be the first fluid gallery which extends around the tube, and the two valves would be part of a single valve assembly. The high pressure valve and the low pressure valve in such an integrated design would typically be substantially coaxially arranged. The high pressure valve may be an annular valve located around the tube, such that it is internally radially guided by the exterior of the tube. In such embodiments the high pressure valve seat may be formed on the bulkhead, and drillways may extend between the high pressure valve seat and the working chamber (similar to the radial passages 38 which connect to the fluid region around the low pressure valve 28), such drillways being interleaved but not intersecting with the low pressure radial passages 38.

In embodiments in which the valve assembly is connected to the working chamber of a piston/cylinder arrangement required to perform both pumping and motoring, both the high pressure valves and low pressure valves will be actuated valves and thus may share a magnetic circuit in terms of being actuated by the same actuator (e.g. by the same solenoid coil).

Further variations and modifications may be made within the scope of the invention herein disclosed.

The invention claimed is:

1. A valve assembly for regulating the flow of working fluid between a working chamber of a fluid working machine and a working fluid gallery, the valve assembly comprising:
   a valve comprising a valve member and one or more cooperating valve seats;
   an actuator actuatable to apply a force to urge the valve member away from or towards the one or more valve seats; and
   a coupling between the actuator and the valve member comprising a connector located at least partially within a tube,
   wherein a connector void provided between at least a portion of the connector and the tube is in fluid communication with a working fluid gallery outlet, and
   wherein the connector void is in fluid communication with the valve only by way of one or more leakage paths defined by clearances between valve assembly components, which clearances are smaller than or equal to close running or sliding fits.

2. The valve assembly according to claim 1, wherein the connector void is in fluid communication with the working fluid gallery outlet throughout a valve actuation cycle.

3. The valve assembly according to claim 1, wherein the at least part of the connector located within the tube, extends in an axial direction of the valve assembly.

4. The valve assembly according to claim 1, wherein the connector void is in fluid communication with the working fluid gallery outlet, where said outlet comprises one or more generally radially extending fluid passages.

5. The valve assembly according to claim 1, wherein the coupling further comprises an armature located within an armature void which is in fluid communication with the connector void such that the armature void is in fluid communication with the working fluid gallery outlet by way of the connector void.

6. The valve assembly according to claim 5, wherein the tube comprises at least one tube void located within one or more walls of the tube, the at least one tube void providing a fluid flow path between the working fluid gallery outlet and the armature void and/or the connector void.

7. The valve assembly according to claim 5, wherein the armature and the valve member are coupled to each other by the connector.

8. The valve assembly according to claim 5, wherein a clearance of the clearances is provided between a first connector guide, located adjacent to the valve such that it is exposed at one side to fluid pressure around the valve, and the connector.

9. The valve assembly according to claim 8 further comprising a second connector guide which provides radial guidance for the connector.

10. The valve assembly according to claim 8, wherein the tube extends through a fluid gallery and at least part of an outer wall of the tube forms part of a wall of the fluid gallery.

11. The valve assembly according to claim 10, wherein the tube is fixedly attached to or integrally formed with a base component and configured to form a hermetic seal for the fluid gallery.

12. The valve assembly according to claim 10, wherein the valve is a low pressure valve, the working fluid gallery is a low pressure fluid gallery, and the fluid gallery is a high pressure fluid gallery.

13. The valve assembly according to claim 11, wherein a portion of the connector void and/or one or more of the generally radially extending fluid passages, extend completely through the base component.

14. A fluid working machine comprising a working chamber, a working fluid gallery and a valve assembly, the valve assembly being arranged to regulate a flow of working fluid between the working chamber and the working fluid gallery, the valve assembly comprising:
 a valve comprising a valve member and one or more cooperating valve seats;
 an actuator actuatable to apply a force to urge the valve member away from or towards the one or more valve seats; and
 a coupling between the actuator and the valve member comprising a connector located at least partially within a tube,
 wherein a connector void provided between at least a portion of the connector and the tube is in fluid communication with a working fluid gallery outlet, and
 wherein the connector void is in fluid communication with the valve only by way of one or more leakage paths defined by clearances between valve assembly components, which clearances are smaller than or equal to close running or sliding fits.

15. The fluid working machine according to claim 14, wherein the fluid working machine comprises a plurality of working chambers each associated with a respective valve which is selectively connected to the working fluid gallery by said respective valve.

16. The fluid working machine according to claim 14, wherein the tube extends completely through a fluid gallery, thereby forming part of the wall of the fluid gallery and/or is fixedly attached to or integrally formed with a base component configured to form a hermetic seal for the fluid gallery.

17. The fluid working machine according to claim 16, wherein the valve is a low pressure valve, the working fluid gallery is a low pressure fluid gallery, and the fluid gallery is a high pressure fluid gallery.

18. A valve assembly for regulating the flow of working fluid between a working chamber of a fluid working machine and a working fluid gallery, the valve assembly comprising:
 a valve comprising a valve member and one or more cooperating valve seats;
 an actuator actuatable to apply a force to urge the valve member away from or towards the one or more valve seats; and
 a coupling between the actuator and the valve member comprising a connector located at least partially within a tube,
 wherein a connector void provided between at least a portion of the connector and the tube is in fluid communication with a working fluid gallery outlet,
 wherein the coupling further comprises an armature located within an armature void which is in fluid communication with the connector void such that the armature void is in fluid communication with the working fluid gallery outlet by way of the connector void, and
 wherein the connector void is in fluid communication with the valve by way of a leakage path through a clearance provided between a first connector guide, located adjacent to the valve such that it is exposed at one side to fluid pressure around the valve, and the connector.

* * * * *